US009628592B2

United States Patent
Wu

(10) Patent No.: US 9,628,592 B2
(45) Date of Patent: Apr. 18, 2017

(54) WIRELESS WATER REGIMEN DETECTING DEVICE, SYSTEM AND METHOD BASED ON WIFI

(71) Applicant: Xiujun Wu, Shenzhen (CN)

(72) Inventor: Xiujun Wu, Shenzhen (CN)

(73) Assignee: Vexilar, Inc., Bloomington, MN (US)

( * ) Notice: Subject to any disclaimer, the term of this patent is extended or adjusted under 35 U.S.C. 154(b) by 71 days.

(21) Appl. No.: 13/980,576

(22) PCT Filed: Jan. 18, 2013

(86) PCT No.: PCT/CN2013/070667
§ 371 (c)(1),
(2) Date: Jul. 19, 2013

(87) PCT Pub. No.: WO2014/029198
PCT Pub. Date: Feb. 27, 2014

(65) Prior Publication Data
US 2014/0066125 A1    Mar. 6, 2014

(51) Int. Cl.
*G01S 3/80* (2006.01)
*B06B 1/06* (2006.01)
(Continued)

(52) U.S. Cl.
CPC ........... *H04M 1/0202* (2013.01); *A01K 97/00* (2013.01); *G01S 7/003* (2013.01); *G01S 15/96* (2013.01); *H04W 4/027* (2013.01)

(58) Field of Classification Search
CPC .................. G01S 15/96; H04B 13/02
(Continued)

(56) References Cited

U.S. PATENT DOCUMENTS 6,771,562 B2 *  8/2004  Betts .................. A01K 93/02
                                              367/111
8,433,463 B1 *  4/2013  Lieberman .............. G06F 17/00
                                              701/2
(Continued)

FOREIGN PATENT DOCUMENTS

JP    2003344530 A    12/2003
KR    100993227 B1    11/2010

OTHER PUBLICATIONS

European Search Report, European Application No. 13830402.7, search completed Mar. 14, 2016, 7 pages.
(Continued)

*Primary Examiner* — Simon Nguyen
(74) *Attorney, Agent, or Firm* — Patterson Thuente; Pedersen, P.A.

(57) ABSTRACT

A wireless water regimen detecting device includes a fish finder module, a data communication module connected to the fish finder module and a WIFI module connected to the data communication module. The present invention utilizes the wireless communication way of WIFI to make the display terminal of the fish finder module not be limited to the wireless receiving terminal which is especially prepared for it, but can use existing intelligent terminals with a WIFI wireless communication function, such as smart phone, tablet PC, notebook computer or other portable mobile devices, to display. The present invention further utilizes the Sweb operating mode of monopoly serial communication port, thus the user can carry on related operation on the webpage of the display terminal by visiting the web server to obtain detecting information of the fish finder module. The present invention provides much convenience for user.

23 Claims, 4 Drawing Sheets

(51) Int. Cl.
  *G01V 1/16* (2006.01)
  *H04M 1/02* (2006.01)
  *H04W 4/02* (2009.01)
  *A01K 97/00* (2006.01)
  *G01S 15/96* (2006.01)
  *G01S 7/00* (2006.01)

(58) Field of Classification Search
  USPC ........... 455/40–41.3, 556.1; 367/107, 910, 3, 367/118, 141, 120, 140, 188
  See application file for complete search history.

(56) References Cited

U.S. PATENT DOCUMENTS

| | | | |
|---|---|---|---|
| 9,137,977 B2* | 9/2015 | Davidson | A01K 85/01 |
| 2005/0218256 A1* | 10/2005 | Ikuta et al. | 242/288 |
| 2006/0191185 A1* | 8/2006 | Hansen | A01K 91/08 43/27.4 |
| 2007/0147173 A1* | 6/2007 | Park | G01S 7/521 367/107 |
| 2007/0159923 A1* | 7/2007 | Huff | A01K 91/20 367/118 |
| 2007/0220798 A1 | 9/2007 | Davidson | |
| 2012/0015566 A1 | 1/2012 | Salmon | |
| 2013/0016586 A1* | 1/2013 | Craig | G01S 7/524 367/107 |
| 2013/0215719 A1* | 8/2013 | Betts et al. | 367/88 |
| 2013/0271301 A1* | 10/2013 | Kabel et al. | 340/987 |
| 2014/0010043 A1* | 1/2014 | Pawlik et al. | 367/7 |
| 2014/0022864 A1* | 1/2014 | Lebedev | G01S 7/003 367/107 |
| 2014/0057677 A1* | 2/2014 | Liubinas et al. | 455/556.1 |
| 2014/0071167 A1* | 3/2014 | Lauenstein et al. | 345/634 |
| 2014/0249698 A1* | 9/2014 | Salmon et al. | 701/2 |
| 2014/0321242 A1* | 10/2014 | Acker et al. | 367/87 |
| 2015/0085602 A1* | 3/2015 | Lebedev | G01S 7/003 367/3 |
| 2015/0100658 A1* | 4/2015 | Lieberman et al. | 709/208 |
| 2015/0312526 A1* | 10/2015 | Coleman | G01S 15/87 348/81 |
| 2016/0007581 A1* | 1/2016 | Davidson | A01K 85/02 43/17.1 |

OTHER PUBLICATIONS

International Search Report of the PCT Application No. PCT/CN2013/070667.

* cited by examiner

WIRELESS WATER REGIMEN DETECTING DEVICE, SYSTEM AND METHOD BASED ON WIFI

FIELD OF THE INVENTION

The present invention relates to water regimen detecting devices, and more particularly to a wireless water regimen detecting device, system and method based on WIFI.

BACKGROUND OF THE INVENTION

The existing devices for detecting the depth of water and fish (water regimen detecting device) mostly use wired means, which is not easy to be assembled and applied; although some of the existing water regimen detecting devices use wireless means, the existing water regimen detecting devices all use ASK modulation mode, thus, in practical application, it has some defects as follows: various wireless interference; data is simple; wrong transmission, wrong judgment and short distance of data transmission.

Additionally, in existing technology, the water regimen detecting device changes sonar information to be analog signal or switch signal for transmitting; it has defects that the transmission speed is slow, the data can not be processed intelligently and it need to use the outdated display device as display terminal, but the newest intelligent display terminal such as smart phone can not be used.

SUMMARY OF THE INVENTION

An object of the present invention is to provide a wireless water regimen detecting device, system and method based on WIFI for overcoming the defects of the prior art.

To achieve above object, the present invention adopts the following technical solution:

The wireless water regimen detecting device includes a fish finder module, a data communication module connected to the fish finder module and a WIFI module connected to the data communication module.

In a preferred embodiment, the fish finder module includes a sonar sensor and a sonar detecting circuit connected to the sonar sensor; the communication connection between the fish finder module and the data communication module is serial communication.

In another preferred embodiment, the fish finder module further includes a speed sensor and a speed processing circuit connected to the speed sensor.

In another preferred embodiment, the fish finder module further includes a temperature sensor, a GPS module and a temperature processing circuit connected to the temperature sensor.

In another preferred embodiment, the fish finder module further includes a GPS module.

In another preferred embodiment, the data communication module includes a power circuit, a MCU processor connected to the power circuit and a memory connected to the MCU processor; the MCU processor is further connected to the WIFI module and fish finder module respectively.

The wireless water regimen detecting system based on WIFI includes an aforementioned wireless water regimen detecting device and an intelligent display terminal wirelessly connected to the wireless water regimen detecting device; the intelligent display terminal has a WIFI transceiver circuit wirelessly connected to the WIFI module of the wireless water regimen detecting device.

In a preferred embodiment, the intelligent display terminal may be a smart phone, a tablet computer, a personal computer, a notebook computer or a wireless receiver, each of which is provided with a display screen.

The water regimen detecting method based on WIFI includes the steps of: a fish finder module converts detected analog signal into digital signal and then converts it into sonar data package and makes once sending of the sonar package in one detecting period.

In a preferred embodiment, each sonar package includes detecting information of one detecting point; a data communication module of a wireless water regimen detecting device based on WIFI sets the number of points of each row of the detecting information of the sonar package and then sends it according to the display resolution of an intelligent display terminal In another preferred embodiment, the intelligent display terminal carries on a point-to-point wireless communication with the wireless water regimen detecting device by WIFI wireless communication, the sonar data package of the wireless water regimen detecting device is sent to the intelligent display terminal, the display screen of the intelligent display terminal displays in a row by row way, the intelligent display terminal is a dedicated wireless receiver or a smart phone, tablet PC, notebook computer loading an application program;

or, the intelligent display terminal make a wireless communication connection with the wireless water regimen detecting device by WIFI, directly inputs the IP address of the wireless water regimen detecting device in its browser, visits the web server of the wireless water regimen detecting device; the web server is in a Sweb operating mode of monopoly serial communication port; when the intelligent display terminal visits the webpage of the wireless water regimen detecting device, the wireless water regimen detecting device detects the display resolution of the intelligent display terminal, makes the sonar data package produce relevant webpage data format according to the display resolution and then store it in the space of the web server for visit and read by the intelligent display terminal.

Compared with the prior art, the present invention has the following beneficial effects: the present invention utilizes the wireless communication way of WIFI to make the display terminal of the fish finder module not be limited to the wireless receiving terminal which is especially prepared for it, but can use exciting intelligent terminals with a WIFI wireless communication function to display, such as smart phone, tablet PC, notebook computer or other portable mobile devices. The present invention further utilizes the Sweb operating mode of monopoly serial communication port to make the user can carry on related operation on the webpage of the display terminal by visiting the web server to obtain detecting information of the fish finder module. The present invention provides much convenience to user. Because of adopting the data processing means of making the data to be data package firstly and then sending it, the data safety and transmission speed of the wireless water regimen detecting production can be improved, and the wireless water regimen detecting production of the present invention can be used with all kinds of smart phones on sale.

Now the present invention will further be described as follows by combining accompanying drawings and specific embodiments.

| A | wireless water regimen detecting device; | | |
|---|---|---|---|
| B | intelligent display terminal; | | |
| 10 | fish finder module; | 11 | sonar sensor; |
| 12 | sonar detecting circuit; | 13 | speed sensor; |
| 14 | speed processing circuit; | 15 | temperature sensor; |
| 16 | temperature processing circuit; | 17 | GPS module; |
| 20 | data communication module; | 21 | power circuit; |
| 22 | MCU processor; | 23 | memory; |
| 30 | WIFI module; | 40 | WIFI transceiving circuit. |

DETAILED DESCRIPTION OF ILLUSTRATED EMBODIMENTS

For understanding the technical content of the present invention more sufficiently, now combine specific embodiments to introduce and illustrate the technical solution of the present invention as follows, but it is not limited to this.

Figure 1:
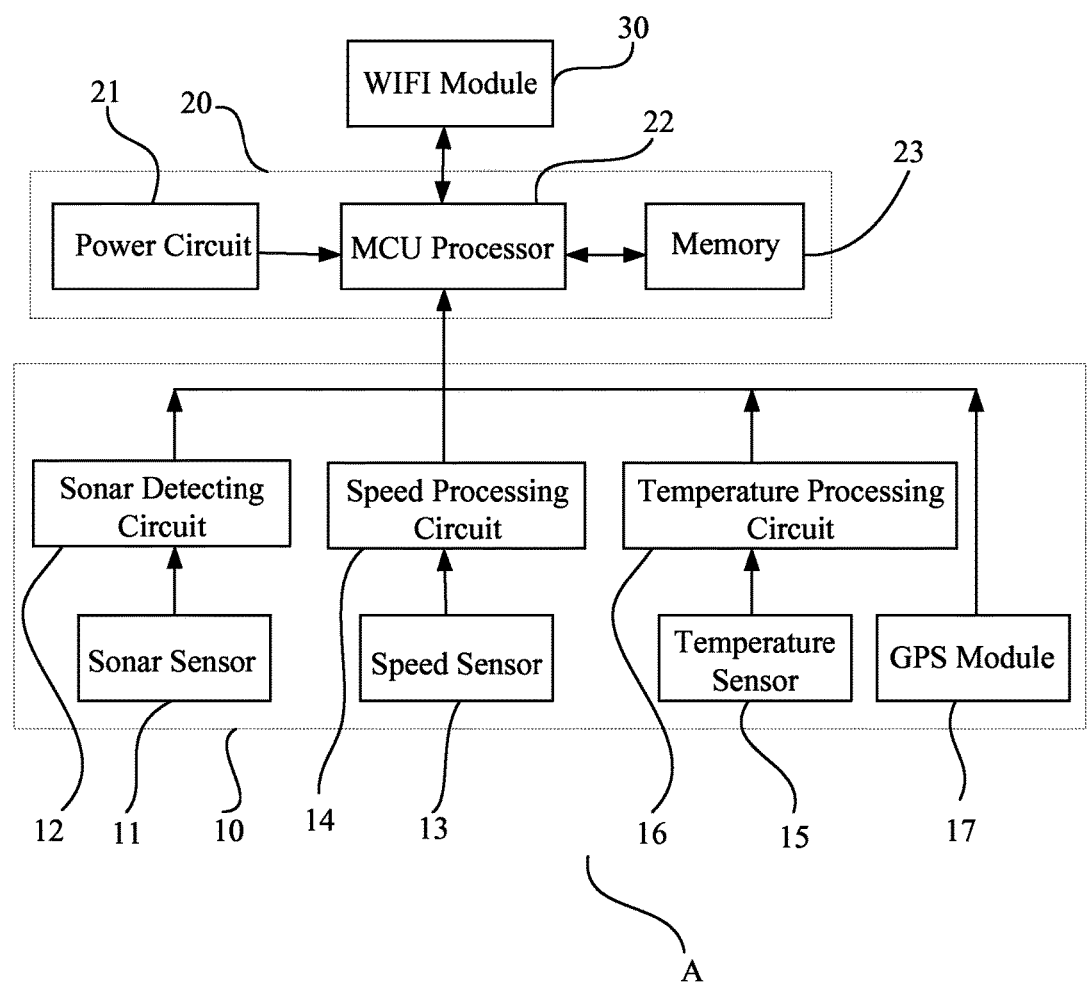
FIG. 1 is a structure block diagram of a wireless water regimen detecting device based on WIFI according to a specific embodiment of the present invention.
Figure 2:
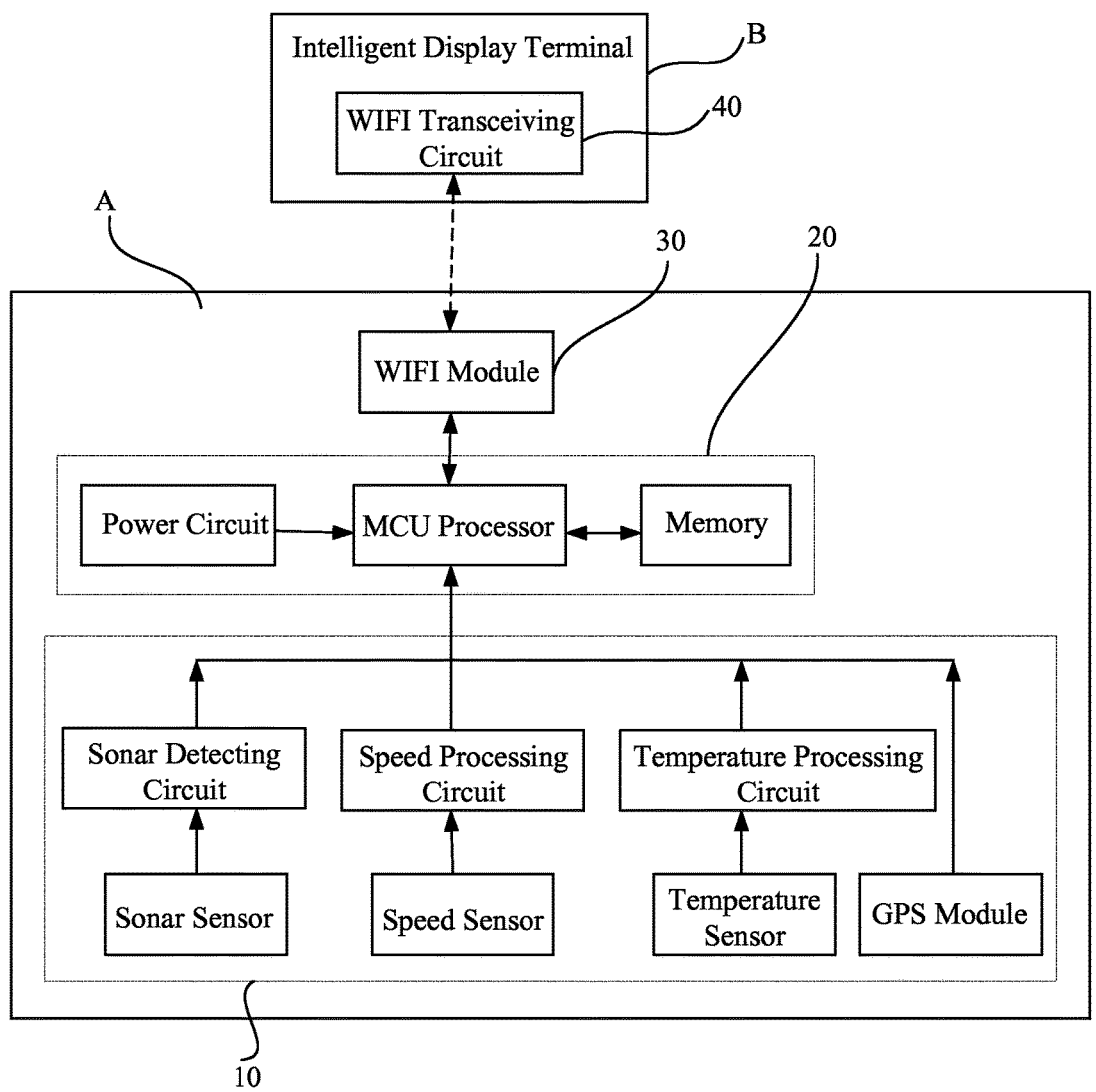
FIG. 2 is a structure block diagram of a wireless water regimen detecting system based on WIFI according to a specific embodiment of the present invention.
Figure 3:
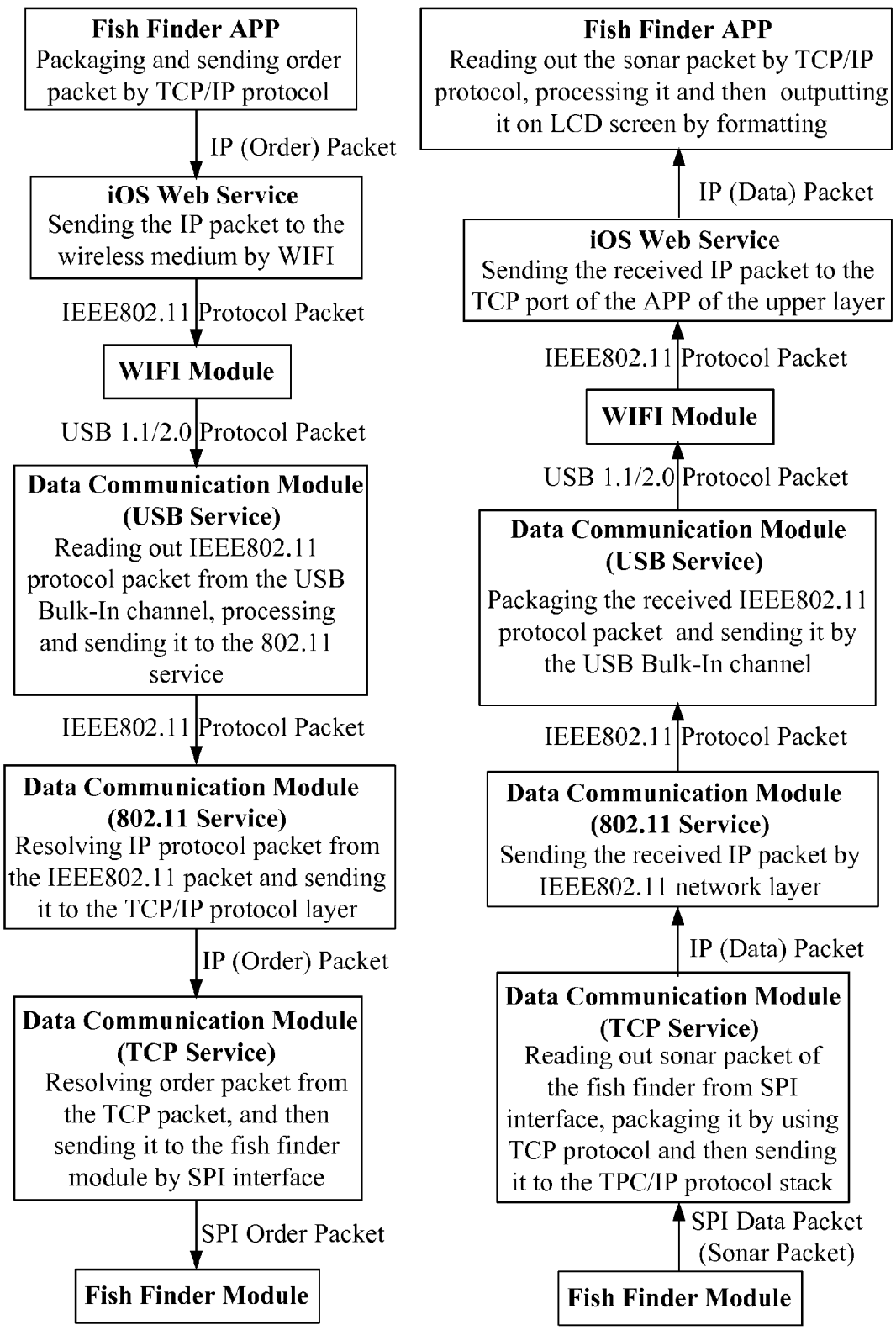
FIG. 3 is a schematic diagram illustrating a transmitting process of the sonar data package and instruction package of WIFI fish finder of the wireless water regimen detecting system based on WIFI according to a specific embodiment of the present invention that uses an Iphone as display terminal.

As shown in FIG. 1 to FIG. 3, the wireless water regimen detecting device based on WIFI A of the present invention includes a fish finder module 10, a data communication module 20 connected to the fish finder module 10 and a WIFI module 30 connected to the data communication module 20. The fish finder module 10 includes a sonar sensor 11 and a sonar detecting circuit 12 connected to the sonar sensor 11; the communication connection between the fish finder module 10 and the data communication module 20 is serial communication. The fish finder module 10 further includes a speed sensor 13 and a speed processing circuit 14 connected to the speed sensor 13. The fish finder module 10 further includes a temperature sensor 15 and a temperature processing circuit 16 connected to the temperature sensor 15. The fish finder module 10 further includes a GPS module 17. The data communication module 20 includes a power circuit 21, a MCU processor 22 connected to the power circuit 21 and a memory 23 connected to the MCU processor 22; the MCU processor 22 is further connected to the WIFI module 30 and fish finder module 10.

Wherein, each above-mentioned component will be illustrated as follows:

1. The sonar detecting circuit produces sonar detecting wave, which will be sent by the sonar sensor (transducer), after the sonar sensor receiving real-time reflected wave, it will be magnified and shaped by the sonar detecting circuit, after digital-to-analog conversion in the MCU processor, it will be converted into the number of columns of the points corresponding to the display size of the monitoring end and then sent to the monitoring end (display terminal) via WIFI;

2. The sending frequency and sending speed of the sonar detecting wave are set by the MCU processor according to the need when using;

3. The speed processing circuit and sensor can be composed of Hall switch, the data from the speed processing circuit and sensor will be sent to the MCU processor to calculate the movement speed of the fish finder module, and then sent to the monitoring end via WIFI;

4. The temperature processing circuit and sensor can be composed of thermistor, according to the AD value of thermal effect of the thermistor, the MCU processor calculates out the temperature value, which will be sent to the monitoring end via WIFI;

5. The GPS module is provided for locating longitude and latitude, which is calculated by the MCU processor and then sent to the monitoring end via WIFI;

6. The memory unit is provided for supplying sufficient space for software writing and program run;

7. The power control circuit is provided for supplying power to each function unit.

The wireless water regimen detecting system based on WIFI of the present invention includes the aforementioned wireless water regimen detecting device A and an intelligent display terminal B connected to the wireless water regimen detecting device A. The intelligent display terminal has a WIFI transceiver circuit 40 wirelessly connected to the WIFI module of the wireless water regimen detecting device. Wherein, the intelligent display terminal is a smart phone with display screen, a tablet PC, a personal computer, a notebook computer or a wireless receiver.

The detailed description will be shown as follows:

1. At the sonar detecting end of the production: its data is processed by the MCU and then sent to the display monitoring end (display terminal) of the production via WIFI;

2. At the sonar detecting end of the production: its data, according to the control of the display monitoring end of the production, is adjusted automatically to adapt the function of the monitoring display;

3. At the sonar detecting end of the production: it is a provisional self-help network protocol; any intelligent terminal with a WIFI visiting function can visit the detecting end after installing a display monitoring end software (TM);

4. The display monitoring end, which has installed a display monitoring software, runs the software and then can automatically search the sonar detecting end of the production and choose the relevant data of the sonar detecting end;

5. The display monitoring end can search multiple sonar detecting ends simultaneously, and also can preview the data of multiple monitoring ends simultaneously;

6. The data of the sonar detecting end of the production includes the following information: the deepness of water bottom, the real-time signal of underwater characteristic status, fish or barrier, outline of water bottom, temperature, speed, voltage of device, longitude and latitude and so on;

7. The sonar detecting end of the production: the detecting software (TM), according to the control of the monitoring end, can adapt the frequency application of various standard transducers;

8. The sonar detecting end of the production: the detecting software (TM) has a data compression function, thereby improving the wireless transmitting and receiving function.

Figure 4:
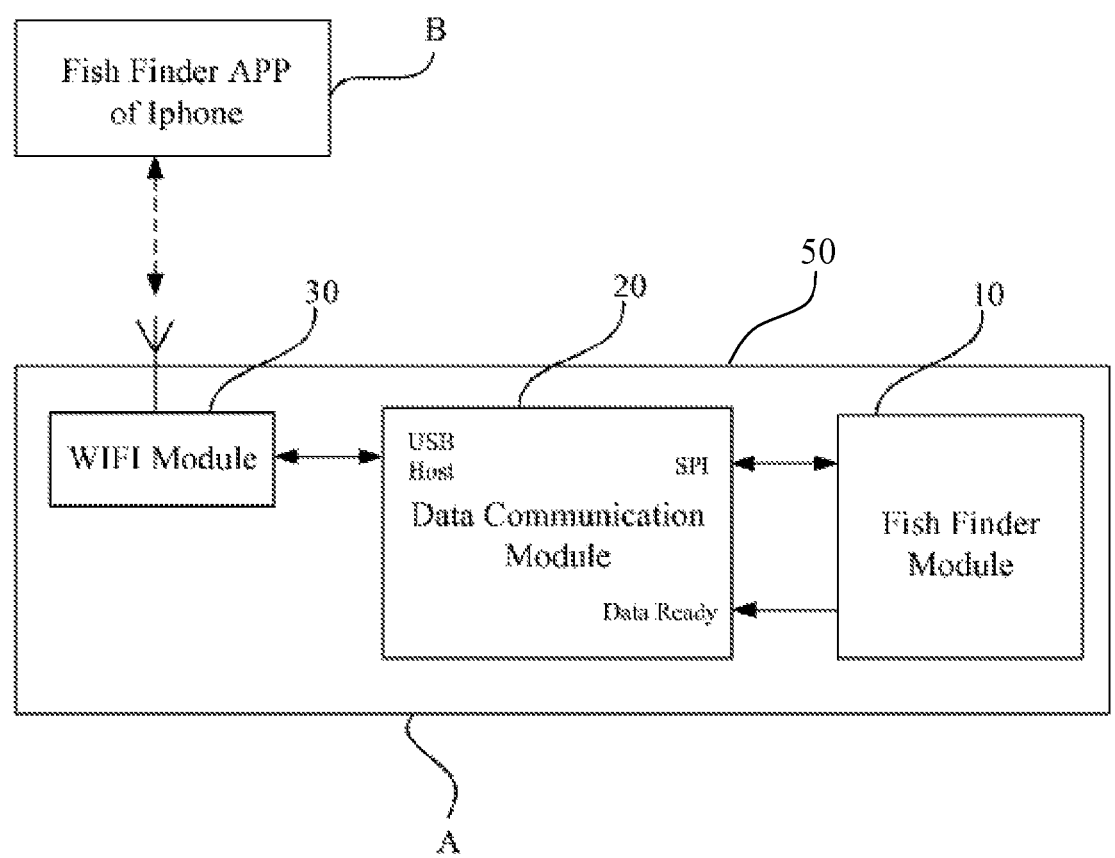
FIG. 4 is a structure block diagram of an embodiment shown in FIG. 3.

FIG. 3 is a schematic diagram illustrating a transmitting process of the sonar data package and instruction package of WIFI fish finder of the wireless water regimen detecting system based on WIFI according to a specific embodiment of the present invention that uses an Iphone as display terminal FIG. 4 is a structure block diagram of the wireless water regimen detecting system based on WIFI of the present invention using building block design, it is composed of the following four modules and a housing 50:

Fish Finder Module:

1) Via SPI interface, receiving the instruction of "data communication module" and responding to the data;

2) Via "data ready" signal line, the "fish finder module" informs the "data communication module" that the data is ready, and then waits for the "data communication module" to read;

Data Communication Module:

1) Using USB host protocol to build a data communication with the WIFI module of the USB interface;

2) Using standard SPI interface and the "data ready" signal line to build a data communication with the "fish finder module";

WIFI Module:

1) Building a data communication with the "data communication module" via USB interface;

2) Building a wireless communication with an Iphone via 2.4G WIFI wireless interface;

Fish Finder APP of the Iphone:

1) Building a communication with the WIFI fish finder via IOS TCP/IP protocol;

2) Sending the instruction package configuration and controlling the "fish finder";

3) Reading the sonar data package of the "fish finder", processing and formatting it and then displaying on the LCD screen.

The wireless water regimen detecting method based on WIFI includes the steps of: the fish finder module converts detected analog signal into digital signal and then converts it into sonar data package and makes once sending of the sonar package in one detecting period. Each sonar package includes detecting information of one detecting point; a data communication module of a wireless water regimen detecting device based on WIFI sets the number of points of each row of the detecting information of the sonar package and then sends it according to the display resolution of an intelligent display terminal.

One way is: the intelligent display terminal is a dedicated wireless receiver or a smart phone, tablet computer, notebook computer, each of which is loaded an application program; via a specific user interface, the intelligent display terminal makes a point-to-point wireless communication with the wireless water regimen detecting device by WIFI wireless communication; the sonar data package of the wireless water regimen detecting device is sent to the intelligent display terminal and the display screen of the intelligent display terminal displays it row by row; for the display screen, the number of displayed columns depends on the width of resolution of the display screen, and the number of each column depends on the height of resolution of the display screen. Such a way has advantages of low cost and fast speed of data transmission, but it needs to install a specific program or use a wireless receiver which is especially prepared.

Another way is: the intelligent display terminal makes a wireless communication connection with the wireless water regimen detecting device by WIFI, directly inputs the IP address of the wireless water regimen detecting device in its browser and visits the web server of the wireless water regimen detecting device; the web server is in a Sweb operating mode of monopoly serial communication port; when the intelligent display terminal visits the webpage of the wireless water regimen detecting device, the wireless water regimen detecting device detects the display resolution of the intelligent display terminal, makes the sonar data package produce relevant webpage data format according to the display resolution and then stores it in the space of the web server for the intelligent display terminal to visit and read. Wherein, the web server is in a Sweb operating mode of monopoly serial communication port; the wireless connection between the intelligent display terminal and wireless water regimen detecting device is point-to-point ADHOC mode; the data interaction between the serial port communication and web server in Sweb operating mode is in js script programming way, use the method of AJAX+POST, control the data transmitting and receiving in the browser background and display in the browser foreground. Concretely, it will be described as follows: the DHCP function under the ADHOC mode (point-to-point): ADHOC mode (point-to-point) is a very simple networking mode and dispenses with wireless router, multiple nodes can build network and communicate with each other expediently. Such networking mode determines the dynamics of the network the node can be added or dropped out at any time. After being added, it can exchange data with other nodes, and it will disappear if it is dropped out. Each ADHOC node has equal position, and no one can assign an address to others like an AP (Network Bridge). Thus, when use the ADHOC network, the user needs to give the module a static IP address. The characteristic of this way is that the intelligent display terminal only needs to make its browser build a communication with WIFI without loading a specific program.

The detail of DHCP dynamic IP address allocation function will be described as follows:

The module needs to use ADHOC network and DHCP simultaneously to obtain two IP setting.

The ADHOC network is built by the first power-on module, when the node used for building network finds that only the one itself is in the same network, it will use the IP address set under default and static status as its IP, and guide one DHCP server to assign IP to the nodes of the later module or the notebook, smart phone connected to the same ADHOC network. This way does not require the user to set the IP address, thereby ensuring good experience of use.

The summarize of Sweb: in our design idea, the web server is a important part, its homepage, status page and configuration page have sufficiently shown its effect and function.

The supply of user storage space makes the applications of customizing page, writing JS script logic, placing Flash and deploying JavaApplet be possible, and the Sweb mode realizes to visit the serial port in page logic.

The principle of this Web interface application is that: the server-side (module) provides interface frame (html\css\img) and logic (js) all at once, and provides dynamic data (in ajax way) more than once; the user needs to connects the hardware to the serial port of the device, prepares the static data (designing webpage and page logic JS) and programs the format of the dynamic data (the device end programming the command protocol).

Sweb mode is an operating mode of the monopoly serial port of the webpage server. In the browser, the files of user can be visited via the path of "/sweb/". No matter it is Sweb mode or not, the user can visit the files under the directory of "/sweb/". Under the Sweb mode, the visiting of the browser to the device IP will be redirected to the file of "/sweb/index.htm". Under the Sweb mode, the browser visits the serial port by "/sweb.cgi".

For instance, when visiting "http://192.168.1.254/sweb.cgi", the page will return serial cache data; supporting three kinds of parameters: "file" indicates requested file, "wait" indicates setting the waiting time of serial port, "clean" indicates emptying the serial port for receiving cache; ".GET default" is used for asking for file data, if the parameter "wait" does not be set, it will be replaced by the default value "HoldTime" of the parameter configuration; POST is generally used for sending data, no setting the parameter "wait" indicates no reading the serial port, if setting "wait=0", it indicates no waiting, that means reading cache directly after sending; the parameter "clean" is used for emptying the serial port for receiving cache, the affect of the messy data can be cleared up by setting the parameter "clean", so as to suitable for the working mode of "command, reply"; its detailed process includes: emptying cache, sending prompt, waiting for receiving, reading cache and returning to page. The parameter "wait" is used for setting the waiting time for the serial port, and its unit is ms.

Web Visit of the Sweb Mode:

WifimodII provides storage space for storing the user page file, except reading data from the locality, wifimodII also supports to obtain file from the serial port.

Visiting Homepage:

Under the Sweb mode of wifimodII, visiting the default homepage (http://IP) will be redirected to the user space "/sweb/index.htm".

The user can modify this page to realize a user-defined user interface. The default homepage is the page of the device itself, it is equated to "http://192.168.1.254/index.htm".

Visiting the Files in User Space:

The files in user space (directory of "/sweb") can be visited by the way such as "http://192.168.1.254/sweb/abc.xyz".

Requesting Page by Serial Port:

The client requests files from the serial port, its chaining is:

"http://192.168.1.254/sweb.cgi?file=usr.htm&clean=l&wait=2000"

"file=usr.htm" indicates that the requested file name is "usr.htm" (may include path).

"clean=1" indicates that emptying for receiving cache before the serial obtains feedback;

"wait=2000" indicates that the longest idle waiting time of the serial port is 2000 ms after the prompt message is outputted;

Entering above address into the address bar of the browser, wifimodII will empty the serial port for receiving cache and the character string "swebgetusr.htm\r\n" ("\r\n" is a carriage return) will be outputted from the serial port. After that, the data received by the serial port will be returned to the browser until can not receive the data in 2000 ms.

Interacting Data with the Serial Port:

The data interaction with the serial port under Sweb operating mode is in js script programming way, use the method of "AJAX+POST", control the data transmitting and receiving in the browser background and display it in the browser foreground. This way of data interaction will not suffer the affect of the browser cache mechanism.

In conclusion, the present invention utilizes the wireless communication way of WIFI to make the display terminal of the fish finder module not be limited to the wireless receiving terminal which is especially prepared for it, but can use exciting intelligent terminals with a WIFI wireless communication function to display, such as smart phone, tablet PC, notebook computer or other portable mobile devices. The present invention further utilizes the Sweb operating mode of monopoly serial communication port to make the user can carry on related operation on the webpage of the display terminal by visiting the web server to obtain detecting information of the fish finder module. The present invention provides much convenience to user. Because of adopting the data processing means of making the data to be data package firstly and then sending it, the data safety and transmission speed of the wireless water regimen detecting production can be improved, and the wireless water regimen detecting production of the present invention can be used with all kinds of smart phones on sale.

Above descriptions are provided for further illustrating the technical content of the present invention by embodiments, so as to make the reader understand easily. But it not represent that the mode of execution is just limited to be this, any technique extension and recreation according to the present invention is protected by the present invention.

What is claimed is:

1. A wireless fish finder device configured to be deployed on water and to communicate with a remote terminal using WIFI, the wireless fish finder device comprising:
    a housing configured to be deployed on water;
    a fish finder module arranged at the housing and comprising a temperature sensor and a temperature processing circuit mechanically connected to the temperature sensor;
    a data communication module arranged in the housing and mechanically connected to the fish finder module; and
    a WIFI module arranged in the housing, mechanically connected to the data communication module, and configured to generate a WIFI hotspot to communicate between the housing and the remote terminal.

2. The wireless fish finder device according to claim 1, wherein the fish finder module comprises a sonar sensor and a sonar detecting circuit connected to the sonar sensor, wherein a communication connection between the fish finder module and the data communication module is serial communication.

3. The wireless fish finder device according to claim 2, wherein the fish finder module further comprises a speed sensor and a speed processing circuit connected to the speed sensor.

4. A wireless fish finder system using WIFI, comprising a wireless fish finder device as claimed in claim 3, and a remote terminal wirelessly connected to the wireless fish finder device, wherein the remote terminal has a WIFI transceiver circuit wirelessly connected to the WIFI module of the wireless fish finder device.

5. The wireless fish finder system using WIFI according to claim 4, wherein the remote terminal comprises at least one of a smart phone, a tablet computer, a personal computer, a notebook computer or a wireless receiver, each of which is provided with a display screen.

6. The wireless fish finder device according to claim 2, wherein the fish finder module further comprises a GPS module.

7. A wireless fish finder system using WIFI, comprising a wireless fish finder device as claimed in claim 6, and a remote terminal wirelessly connected to the wireless fish finder device, wherein the remote terminal has a WIFI transceiver circuit wirelessly connected to the WIFI module of the wireless fish finder device.

8. The wireless fish finder system using WIFI according to claim 7, wherein the remote terminal comprises at least one of a smart phone, a tablet computer, a personal computer, a notebook computer or a wireless receiver, each of which is provided with a display screen.

9. A wireless fish finder system using WIFI, comprising a wireless fish finder device as claimed in claim 2, and a remote terminal wirelessly connected to the wireless fish finder device, wherein the remote terminal has a WIFI transceiver circuit wirelessly connected to the WIFI module of the wireless fish finder device.

10. The wireless fish finder system using WIFI according to claim 9, wherein the remote terminal comprises at least one of a smart phone, a tablet computer, a personal computer, a notebook computer or a wireless receiver, each of which is provided with a display screen.

11. The wireless fish finder device according to claim 2, wherein the sonar sensor comprises a transducer defining a detecting point.

12. The wireless fish finder device according to claim 1, wherein the data communication module comprises a power circuit, a MCU processor connected to the power circuit and a memory connected to the MCU processor, and wherein the MCU processor is further connected to the WIFI module and fish finder module respectively.

13. A wireless fish finder system using WIFI, comprising a wireless fish finder device as claimed in claim 12, and a remote terminal wirelessly connected to the wireless fish finder device, wherein the remote terminal has a WIFI transceiver circuit wirelessly connected to the WIFI module of the wireless fish finder device.

14. The wireless fish finder system using WIFI according to claim 13, wherein the intelligent display terminal comprises at least one of a smart phone, a tablet computer, a personal computer, a notebook computer or a wireless receiver, each of which is provided with a display screen.

15. A wireless fish finder system using WIFI, comprising a wireless fish finder device as claimed in claim 1, and a remote terminal wirelessly connected to the wireless fish finder device, wherein the remote terminal has a WIFI transceiver circuit wirelessly connected to the WIFI module of the wireless fish finder device.

16. The wireless fish finder system using WIFI according to claim 15, wherein the remote terminal comprises at least one of a smart phone, a tablet computer, a personal computer, a notebook computer or a wireless receiver, each of which is provided with a display screen.

17. The wireless fish finder device of claim 1, wherein the WIFI hotspot is configured to be accessible to at least one portable mobile device as the remote terminal.

18. The wireless fish finder device of claim 17, wherein the at least one portable mobile device has an intelligent display terminal having a display screen and a downloadable application for user control of a sonar data package from the wireless fish finder device.

19. A water-based detecting method using WIFI, the method comprising:
    converting an analog signal detected by a sonar sensor of a fish finder module arranged at a housing deployed on water into a digital signal using a sonar detecting circuit arranged at the housing;
    converting the digital signal into a sonar data package with the sonar detecting circuit;
    generating a WIFI hotspot at the housing to transmit the sonar data package from the fish finder module at the housing to a remote terminal;
    sending the sonar data package in one detecting period;
    converting a thermal effect detected by a temperature sensor to a temperature value at a temperature processing circuit arranged in the housing; and
    sending the temperature value to the remote terminal via the WIFI hotspot.

20. The water-based detecting method using WIFI according to claim 19, wherein the housing defines a wireless fish finder device, wherein each sonar package comprises detecting information corresponding to a detecting point, wherein a data communication module arranged in the housing of the wireless fish finder device sets a number of points of each row of the detecting information of the sonar package and then sends the sonar package according to the display resolution of the remote terminal.

21. The water-based detecting method using WIFI according to claim 20, wherein the remote terminal carries out a point-to-point wireless communication with the wireless fish finder device by WIFI wireless communication, the sonar data package of the wireless fish finder device is sent to the remote terminal, the display screen of the remote terminal displays row by row, the remote terminal is a dedicated wireless receiver or a smart phone, tablet computer, notebook computer loading an application program; or, the remote terminal makes a wireless communication connection with the wireless fish finder device by WIFI, directly inputs an IP address of the wireless fish finder device in a browser, visits a web server of the wireless fish finder device, wherein the web server is in a Sweb operating mode of monopoly serial communication port, wherein when the remote terminal visits the webpage of the wireless fish finder device, the wireless fish finder device detects a display resolution of the remote terminal, makes the sonar data package produce a relevant webpage data format according to the display resolution and then stores the produced data format in the space of the web server for visit and read by the remote terminal.

22. A wireless fish finder device configured to be deployed on water and to communicate with a remote terminal using WIFI, the wireless fish finder device comprising:
    a housing configured to be deployed on water;
    a fish finder module arranged at the housing and comprising a sonar sensor and a sonar detecting circuit mechanically connected to the sonar sensor;
    a data communication module arranged in the housing and connected to the fish finder module; and
    a WIFI module arranged in the housing, connected to the data communication module and configured to generate a WIFI hotspot to communicate between the housing and the remote terminal;
    wherein the wireless fish finder device is capable of being wirelessly connected to the remote terminal by a WIFI transceiver circuit wirelessly connected to the WIFI module of the wireless fish finder device, the remote terminal having a display screen and a downloadable application for user control of a sonar data package from the wireless fish finder device.

23. The wireless fish finder device according to claim 22, wherein the remote terminal comprises at least one of a smart phone, a tablet computer, a personal computer, a notebook computer or a wireless receiver.

* * * * *